("12") United States Patent
Zhu et al.

(10) Patent No.: US 10,157,588 B2
(45) Date of Patent: Dec. 18, 2018

(54) SYSTEMS AND METHODS FOR IMAGE OPTIMIZATION

(71) Applicant: EXCALIBUR IP, LLC, New York, NY (US)

(72) Inventors: Ling Zhu, Beijing (CN); Ric Allinson, Sunnyvale, CA (US); Benoit Schillings, Los Altos Hills, CA (US)

(73) Assignee: Excalibur IP, LLC, New York, NY (US)

( * ) Notice: Subject to any disclaimer, the term of this patent is extended or adjusted under 35 U.S.C. 154(b) by 106 days.

(21) Appl. No.: 14/491,070

(22) Filed: Sep. 19, 2014

(65) Prior Publication Data
US 2016/0086566 A1 Mar. 24, 2016

(51) Int. Cl.
*G09G 5/00* (2006.01)
*G06F 17/30* (2006.01)

(52) U.S. Cl.
CPC ....... *G09G 5/005* (2013.01); *G06F 17/30905* (2013.01); *G09G 2320/06* (2013.01); *G09G 2340/0407* (2013.01); *G09G 2340/0442* (2013.01)

(58) Field of Classification Search
None
See application file for complete search history.

(56) References Cited

U.S. PATENT DOCUMENTS

| 5,953,506 A * | 9/1999 | Kalra | G06T 3/4092 345/428 |
| 6,633,688 B1* | 10/2003 | Nixon | G06T 15/20 382/305 |
| 2009/0245630 A1* | 10/2009 | Johnston | H04N 1/648 382/166 |
| 2013/0258055 A1* | 10/2013 | Chen | H04N 13/0048 348/46 |

OTHER PUBLICATIONS

ImgIX "Image Processing On-Demand, Served By CDN"; http://www.imgix.com; 2014.

* cited by examiner

*Primary Examiner* — Said Broome
(74) *Attorney, Agent, or Firm* — James J. DeCarlo; Greenberg Traurig, LLP

(57) ABSTRACT

Images are optimized to reduce latency prior to being transmitted to requesting client devices. A request from a client device for an image is analyzed to obtain the attributes of the requesting client device and the network used by the client device for transmitting the request. The parameters of the image to be transmitted are determined based on the attributes in order to reduce data latency at the requesting client device. A requested image that meets the parameters or which has its parameters preset by a provider can be transmitted without any changes. A requested image that does not meet the parameters is transformed in accordance with the parameters so that it is optimized for the combination of the network and the requesting client device.

20 Claims, 9 Drawing Sheets

SYSTEMS AND METHODS FOR IMAGE OPTIMIZATION

BACKGROUND

Rapid developments that occurred in mobile data networks and content providing devices have made available numerous information sources to users. Different types of content items such as text, audio, video or combinations thereof are provided to the users at their various devices. Content-providing devices such as tablet devices and smartphones are able to access the content items from almost any location. The number of online information sources has proportionally increased, which lead to a competition among information providers. This requires them to make their websites and/or apps more attractive to capture and hold the users' attention. As a result, modern webpages are configured to include numerous images that can comprise static images, animated images, infographics and videos.

SUMMARY

This disclosure relates to systems and methods for intelligently serving images that are customized to a requesting client device and the network employed to transmit the request. A method for transforming images is disclosed in one or more embodiments. The method comprises analyzing, by a processor, a request for an image received from a client device via a network. A plurality of attributes comprising at least network and client device attributes associated with the request are obtained by the processor via the analysis. Network conditions associated with the request are estimated by the processer based on the prior network conditions data associated with the plurality of attributes. In some embodiments, a connection speed associated with the network based at least on the network attributes, the network attributes comprising a type of network connection, a network operator, location and time of the request can be deduced by the processor.

Optimized parameters comprising the image size and quality are determined for the image by the processor based on attributes of the image, the plurality of attributes obtained from the request and the estimated network conditions. In some embodiments, the size parameter is determined by determining a screen size of the requesting client device, comparing the screen size with the size of the original image requested by the device and determining value of a factor 's' based on the comparison. Value of the optimized image size is obtained by reducing the original image size by the factor 's'. In some embodiments wherein the image size is smaller than twice the screen size, 's' is equal to one. In some embodiments, wherein the image is larger than twice the screen size, 's' equals (2*the screen size)/the image size.

In some embodiments, a quantization lossy compression to use for altering the quality of the image is also determined by the processor, based on the plurality of attributes by accessing a pre-generated table comprising values for connection speed versus network conditions. A transformed image thus generated in accordance with the optimized parameters is transmitted to the client device in response to the request.

A computing device comprising a processor and a storage medium for tangibly storing thereon program logic for execution by the processor is disclosed in some embodiments. Analyzing logic, is executed by the processor, for analyzing a request for an image received from a client device via a network. A plurality of attributes comprising at least network and client device attributes associated with the request are obtained via the analysis by the obtaining logic, executed by the processor. Accessing logic is executed by the processor for accessing prior network conditions data associated with the plurality of attributes and network conditions associated with the request are estimated based on the prior network conditions data by the estimating logic executed by the processor. In some embodiments, deducing logic, is executed by the processor, for deducing a connection speed associated with the network based at least on the network attributes comprising a type of network connection, a network operator, location and time of the request. Determining logic is executed by the processor, for determining optimized parameters for the image based on attributes of the image, the plurality of attributes obtained from the request and the estimated network conditions.

In some embodiments, the optimized image parameters comprise the size and quality of the image. In order to optimize the image size, the processor further executes, screen size determining logic for determining a screen size of the client device and comparing logic for comparing the screen size with the size of the image. The image size is transformed by a factor 's' based on the comparison by the size transforming logic executed by the processor. A quantization lossy compression to use for altering the quality of the image is determined based on the plurality of attributes by the processor via executing the compression determining logic. In some embodiments, the compression determining logic further comprises table accessing logic, for accessing a pre-generated table comprising values for connection speed versus network conditions.

The image is transformed by the transforming logic executed by the processor, based on the optimized parameters. Transmitting logic is executed by the processor, for transmitting the transformed image to the client device in response to the request.

A computer readable storage medium comprising processor-executable instructions is disclosed in an embodiment. The instructions when executed by the processor cause the processor to analyze a request for an image received from a client device via a network and obtain a plurality of attributes associated with the request. In some embodiments, the plurality of attributes comprise at least network and client device attributes. The instructions also cause the processor to access prior network conditions data associated with the plurality of attributes and estimate network conditions for the request based on the prior network conditions data. Optimized parameters are determined for the image, by the processor, based on attributes of the image, the plurality of attributes obtained from the request and the estimated network conditions. The instructions further cause the processor to transform the image based on the optimized parameters and transmit the transformed image to the client device in response to the request.

These and other embodiments/will be apparent to those of ordinary skill in the art with reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
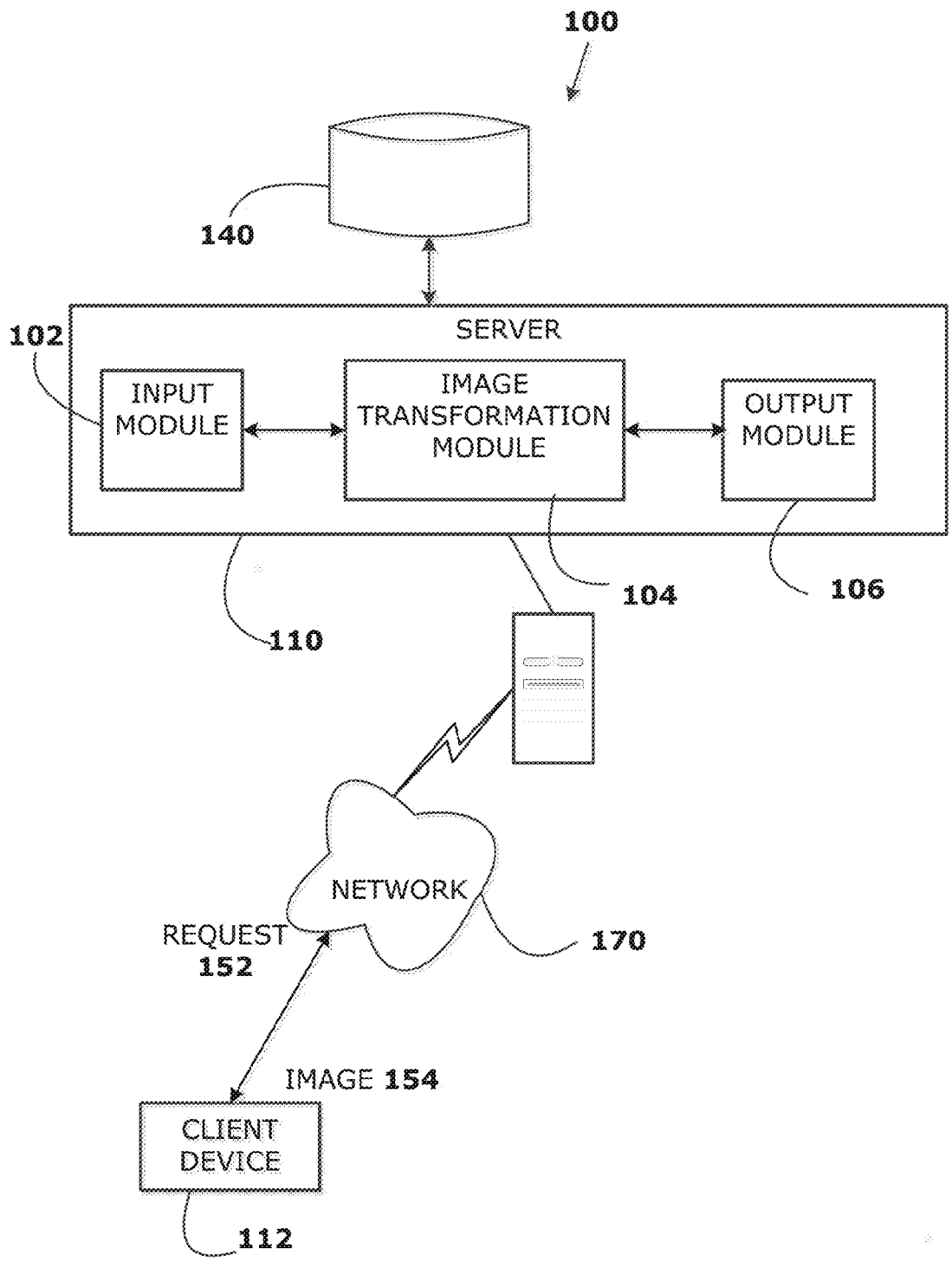
FIG. 1 illustrates a communication system for intelligently serve images in accordance with some embodiments.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

Embodiments are described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server. Servers may vary widely in configuration or capabilities, but generally a server may include one or more central processing units and memory. A server may also include one or more additional mass storage devices, one or more power supplies, one or more wired or wireless network interfaces, one or more input/output interfaces, or one or more operating systems, such as Windows Server, Mac OS X, Unix, Linux, FreeBSD, or the like.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Improvements in graphics producing software packages, digital imaging and animation enabled website developers to incorporate sophisticated graphics, numerous images and even videos in the webpages to attract and retain user attention. While specialized processors capable of handling graphics intensive tasks and high-speed data networks smoothen user access, such image-intensive online information sources can take longer to load especially on congested data networks.

As users increasingly access websites from their portable or handheld devices via mobile data networks this problem is further exacerbated. As a result, mobile data networks which provide limited bandwidths get congested thereby degrading the webpage loading performance. Many users additionally employ data plans with limits on the amount of data they can access via the mobile data network. Such users are also discouraged from accessing image-intensive webpages via the mobile data network. In fact, due to the lower resolution associated with small screen size, a user of the hand-held device may also not particularly notice a qualitative difference between a high-quality image and an image of lower quality. While separate versions of webpages for mobile and tethered data networks may be developed, this is not a cost effective solution. Another solution is to dynamically optimize images when they are served thereby mitigating the need to develop and store multiple versions of the same images or webpages.

Accordingly, systems and methods are disclosed herein for intelligently serving images that are optimized for requesting devices and associated networks. In some embodiments, when a request for images or a webpage comprising images is received, it is analyzed to determine the various attributes associated with the requesting device and the network transmitting the request. Based on the attributes and historical data of network conditions associated with such attributes, the current network conditions associated with the request are estimated. The requested images are also analyzed to determine if and how they may be transformed in order to be optimized for serving on the device via the network so that the loading performance of the webpage or images is not noticeably degraded.

Turning now to the figures, FIG. 1 illustrates a communication system 100 that comprises a sever 110 that is configured to intelligently serve images in accordance with some embodiments. When a request 152 for an image or a webpage comprising an image is received from a client device 112 at the input module 102, it is communicated to the image transformation module 104 in order to determine the plurality of attributes associated with the request 152. By the way of illustration and not limitation, the attributes that are determined by the image transformation module 104 can comprise attributes of the network 170 employed for communication between the server 110 and the client device 112 and the attributes of the client device 112 making the request 152. By the way of illustration and not limitation, the network 170 can comprise wireless or tethered connection to the Internet, a WiFi network, or a mobile data network. Upon determining the attributes, prior data records associated with the determined network attributes are accessed from the database 140 to assess or estimate the current conditions of the network 170. In addition, the database 140 is also configured to provide hardware/software specifications of the client device 112 such as but not limited to, its screen size.

Based at least on the attributes as estimated and obtained from the database 140, the image transformation module 104 determines if the image requested by the client device 112 should be transformed. In some embodiments, the image transformation module 104 can determine, based on the attributes and the image characteristics that no transformation is needed and the original image can be transmitted to the client device 112 without any changes. In some embodiments, a developer who generates the requested image can encode the images with predetermined, fixed parameters so that they may not be changed. In some embodiments, the image transformation module 104 can determine from the attributes that conditions of the network and/or the client device 112 attributes are acceptable to receive the original images without any noticeable effect on their loading performance. In such instances, the requested images are transmitted 154 to the client device 112 without any transformation or changes.

If it is determined that the requested images need to be transformed in order to be optimally presented on the client device 112, image transformation module 104 further determines the various image parameters that need to be modified. By the way of illustration and not limitation, it can be determined that the size of the image needs to be modified in order to be displayed on the display screen (not shown) of the client device 112 without significantly increasing the image loading time. In some embodiments, it can be determined that the compression to be used for the images needs to be modified for optimal display. In some embodiments, it can be determined that both the image size and compression need to be modified based on the combination of attributes associated with the request 152.

Altered image 154 is generated from the original images via transforming various parameters of the image as determined from the attributes. The altered image 154 is transmitted by the output module 106 for display on the client device 112. As the image 154 that are received at the client device 112 are optimized for the unique combination of the network conditions and the device attributes, they can be displayed with minimal latency. Moreover, the altering of the image occurs dynamically and hence mitigates the need for maintenance of various versions of the images. The images thus altered can be images associated exclusively with the server 110 in some embodiments. In some embodiments, the images may be part of the webpages retrieved by the server 110 in response to a user query.

Figure 2:
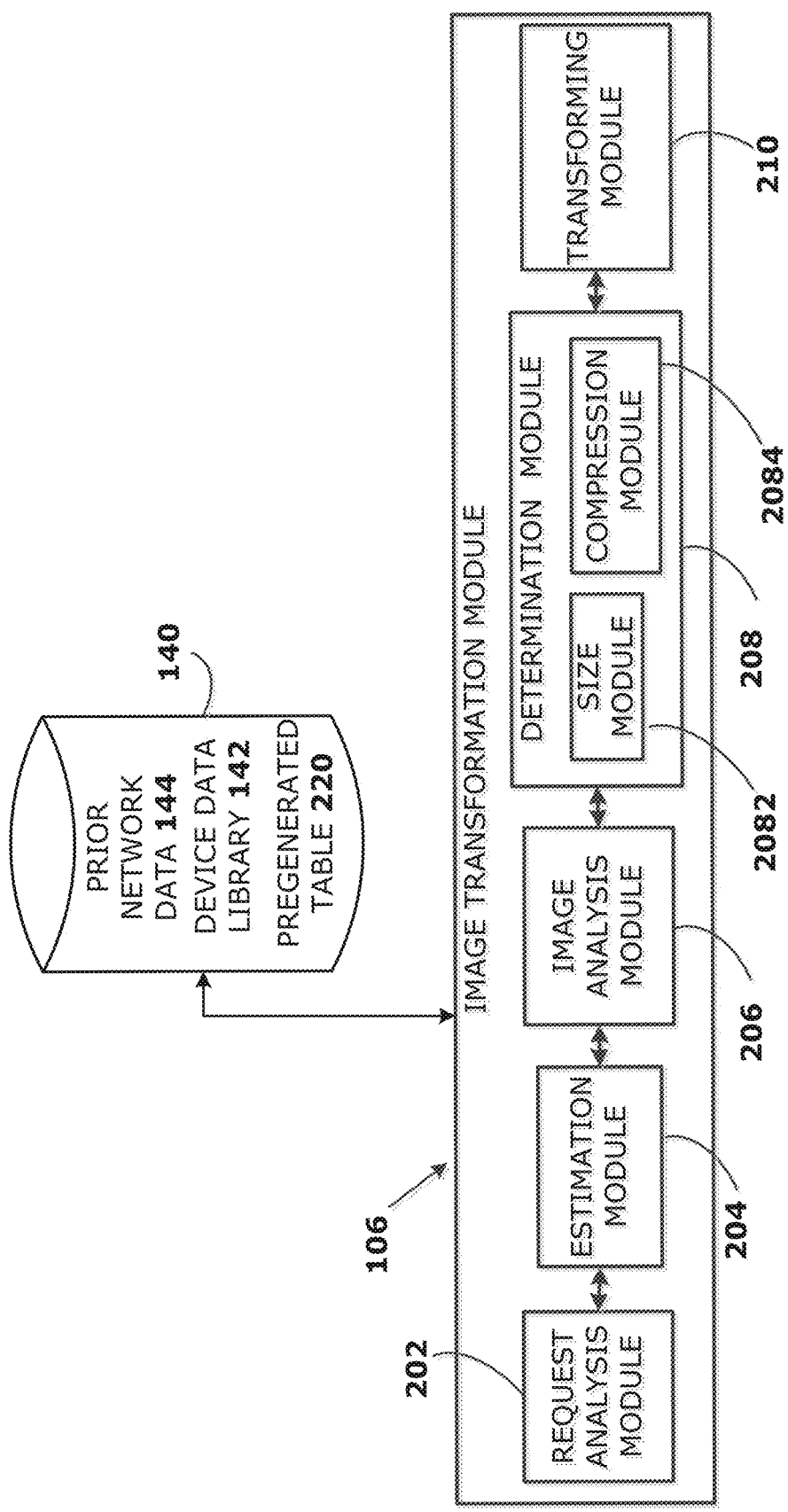
FIG. 2 is a schematic diagram of the image transformation module in accordance with some embodiments.

FIG. 2 is a schematic diagram of the image transformation module 104 in accordance with some embodiments. The analysis module 202 comprised within the image transformation module 104 analyzes the request 152 in order to extract information associated with the request attributes. In some embodiments, the analysis module 202 can obtain the IP address of the request 152 to identify attributes of the network 170 such as the carrier, connection type and the geo-location of the client device 112 making the request. Furthermore, the analysis module 202 can be configured to analyze the header of the request 152 to obtain device attributes such as the type of the client device 112. In some embodiments, a device data library 142 is accessed by the analysis module 202 to further obtain other device attributes, such as, the screen size of the client device 112. In some embodiments, the device data library 142 is a database that stores without limitation, information regarding the various client devices available on the market and their respective hardware/software specifications.

The various attributes thus obtained are accessed by the estimation module 204 which is configured to estimate the conditions of the network 170 at the location of the client device 112. In some embodiments, prior network conditions data 144 can be used to deduce the current network conditions. A weight 'c' indicative of the speed of the network connection between client device 112 and the server 110 can be defined based on the various network attributes obtained by the image transformation module 104. In some embodiments, the weight of the connection speed 'c' can range from 0 to 1, wherein 0 indicates no network connection while higher values indicate a fast, low latency network. For example, if the client device 112 transmitted the request 152 via a 4G network of carrier 'A' in San Francisco, a predetermined weight of 'c=0.9' can be associated with it. In another example, if the client device 112 utilizes a 2G network from the same carrier or another carrier in San Jose, a weight 'c=0.5' can be assigned. It may be appreciated that the scales for the factor 'c' and examples are provided herein only for illustrative purposes and are not limiting. The image transformation module 104 can be configured to use any scale that comprises numeric, alpha numeric or even alphabetical scales for 'c'.

The image analysis module 206 accesses images in order to determine their attributes. By the way of illustration and not limitation, the image analysis module 206 can determine image attributes, such as, size, quality, number of images on the webpage, any predetermined conditions associated with the images and the like. For example, certain images may have a fixed size, quality or combinations thereof as determined by the entity providing the image. In this case, the image transformation module 104 transmits the image without transformation in accordance with the attributes as determined by the entity providing the image. When the image is associated with fixed, predetermined attributes, such image is transmitted directly by the output module 106 to the client device 112 without any changes regardless of the network and/or device attributes.

The determination module 208 receives the various attributes of the client device 112, network 170 and the image in order to determine if the image needs to be transformed for efficient transmission and rendering at the client device 112. Furthermore, the determination module 208 can be configured to select the attributes of the image that need to be transformed for the efficient transmission and rendering. In some embodiments, one or more of the size, compression and other attributes of the image can be transformed. Again, if the image or the entity providing the image assigns such attributes explicitly then such attributes are not transformed or changed by the image transformation module 106.

In some embodiments, the determination module 208 further comprises a size module 2082 that is configured to compare the size of the image with the screen size of the client device 112 to determine if the image size should be changed. Furthermore, if it is determined that the image size should be changed, the size module 2082 further determines the new size for the image. In some embodiments, the size module 2082 determines a scale factor 's' in order to select a new size for the image. In some embodiments, if the size of the image (Image_size) is smaller than twice the screen size of the client device 112, (device_screen_size), or $$Image\_size < 2*(device\_screen\_size),$$

$$s=1;$$

$$New\_image\_size = 1 * Image\_size$$

Thus, when the image size is less than twice the device screen size, the original image size is maintained. The image size is, however, altered if the image size is more than twice the screen size of the client device 112. In some embodiments, if $$Image\_size > 2*(device\_screen\_size),$$

$$s=(2*device\_screen\_size)/Image\_size$$

$$New\_image\_size = s * Image\_size$$

The determination module 208 additionally comprises a compression module 2084, which can determine the best quantization lossy compression to use for the image. In some embodiments, the compression module 2084 is configured to make this determination via a pre-generated table 220 that maps the compressions to use with weighing factor 'c' for the network conditions. In some embodiments, the table can further include a three-way match between the weighing factor 'c', time of the day and the compression ratio to use. For example, at 8.30 AM on a weekday, networks are generally are loaded for major carriers. During such time, the compression module 2084 can be automatically set to increase the compression ratio dynamically. Conversely, the compression module 2084 can be configured to use lower compression ratios during non-peak hours when data networks are less loaded.

It may be appreciated that the aforementioned factors are discussed only by the way of illustration and not limitation. In addition to the network conditions and device attributes, other factors for example, the number of images on the web page associated with the request 152 can be used in determining the size and compression ratio for the image. Also, it can be appreciated that one or more of the size and/or compression ratio can be changed depending on various factors discussed herein.

The transforming module 210 receives the image and information associated with the image parameter transformation and transforms the image accordingly. One or more of the image size, compression ratio of an image can be transformed by the transforming module 210. In some embodiments, the image to be transformed can exist on the server 110. In some embodiments, the image to be transformed can be received in a webpage from another server associated with a third-party resource. The image 154 thus transformed is transmitted to the client device 112. As the size and compression ratio of the image 154 is adjusted or optimized for the current conditions of the network 170 and for the parameters of the client device 112, the transformed image 154 loads much faster on the client device 112 than the original image would have loaded if it had been transmitted to the client device 112.

By the way of illustration and not limitation, a user employing a client device such as, an iPhone 4, requests 152 an image with original dimensions of 2048*1536 pixels having a file size of 1.5 MB (Megabytes). The request analysis module 202 can detect from the request 152 that it originated from iPhone 4 on a 3G network 170. Based on the information from the device data library 142, the determining module 206 determines that iPhone 4 has a screen size of 640*960 pixel resolution and hence, an image width no greater than 1280 pixels is needed. Thus, based on the screen size and the information that the request originated on a 3G network, the transforming module 210 can transform the original image to have new size of 1280*960 pixels which in turn reduces the file size to 247 kilobytes. Similarly, if the request 152 originates from a Nokia N95, with a screen size of 320*249 on a 2G network, the image transformation module 104 generates a new image of 640*480 pixels with a file size of 41 kilobytes. As seen from the above examples, a single image transmission is transformed from a task requiring a 1.5 MB data transfer to a task of 247 kilobytes data transfer or even further to a task of transferring just 41 kilobytes of data. When a webpage comprises many images, such data transfer optimizations can result in substantial reduction in data latency.

Figure 3:
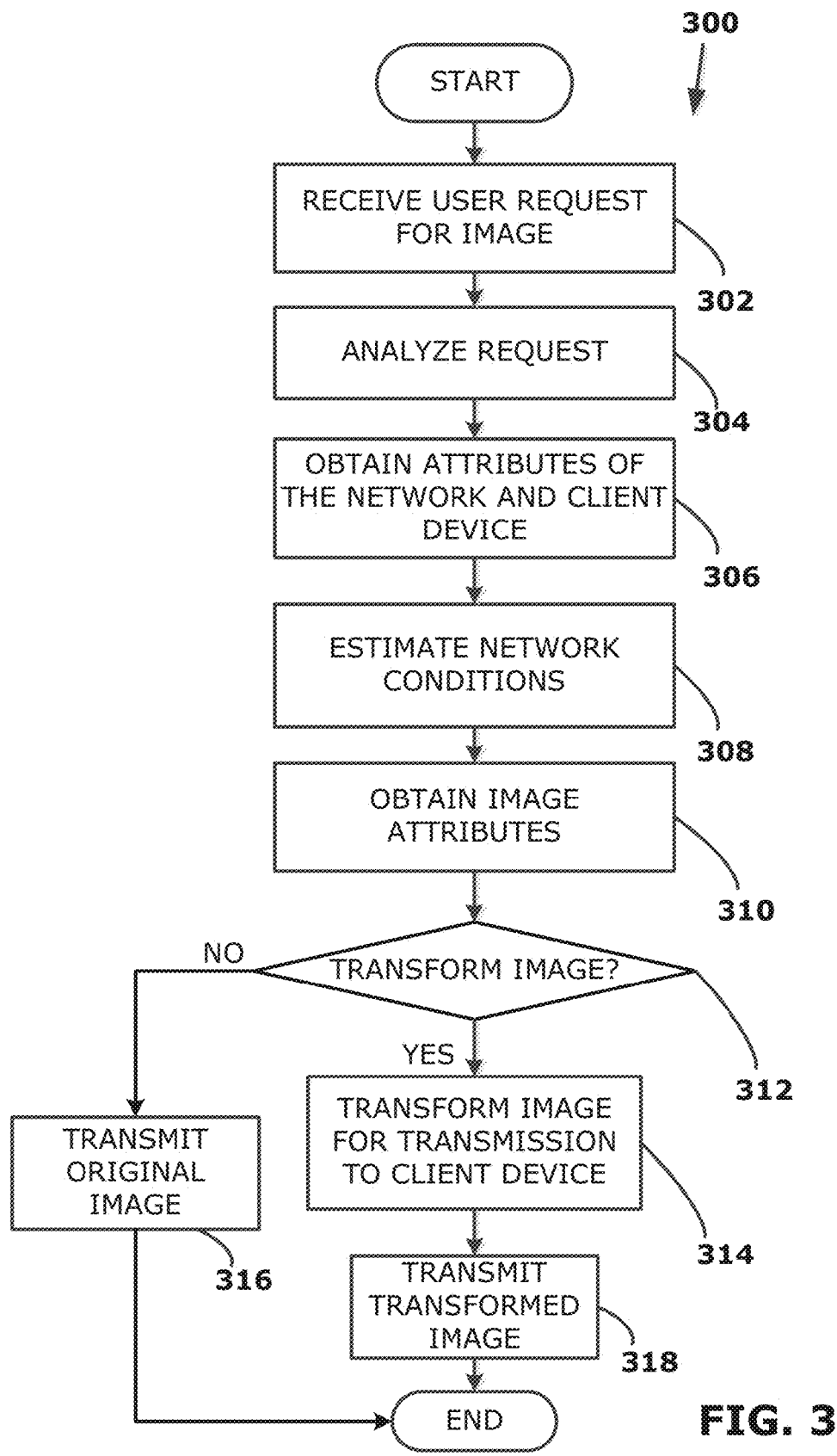
FIG. 3 a flowchart detailing a method of serving images optimized for a requesting device in accordance with embodiments detailed herein.

FIG. 3 a flowchart 300 detailing a method of serving optimized images in accordance with embodiments detailed herein. The method begins at 302 wherein a request 152 for an image is received from a client device in accordance with some embodiments. At 304, the received request is analyzed in accordance with embodiments described herein. Based on the analysis at 304, a plurality of attributes comprising attributes of the network 170 transmitting the request 152 and the attributes of the client device 112 at which the request originated are obtained at 306. By the way of illustration and not limitation, attributes, such as the network type including but not limited to 2G, 3G, 4G, WiFi, mobile data networks and the like, the spatial and temporal attributes of the request 152, identity of the service provider for the client device 112, hardware/software specifications of the client device 112 can be determined at 306. At 308, the network conditions associated with the request are estimated, for example, via accessing data 144 for prior conditions on the network 170.

In some embodiments, the current network conditions can be estimated or deduced from the prior network data 144 via statistical methodologies that are currently know or to be invented. In some embodiments, the prior network data 144 can comprise network speeds or weight 'c' associated with the network having attributes as determined at 306. At 310, the image attributes are obtained. In some embodiments, the image attributes can be transmitted with the image. For example, if the entity supplying the image provides the image with fixed size/compression ratio, then such fixed attributes can be retrieved along with the image. In some embodiments, the height/width of the image can be obtained from the script of the webpage comprising the image.

At 312, it is determined if the image should be transformed in order to be efficiently transmitted and rendered at the client device 112. In some embodiments, wherein the image has predetermined parameters fixed by the owner, developer or the entity supplying the image, the image transformation process is overridden and the original image can be transmitted to the client device at 316. In some embodiments, if the image is small enough that it can be transmitted and rendered without causing undue data latency, then the original image can be transmitted to the client device at 316. For example, threshold image dimensions and threshold image file size can be predetermined in the image transformation module 104 for transmission of original images so that any image that exceeds the thresholds can be further analyzed for optimizing its transmission in accordance with embodiments described herein. If it is determined at 312 that the image needs to be changed or altered for optimizing its transmission and rendering, the image transformed at 314 and the transformed image is transmitted to the client device at 318.

Figure 4:
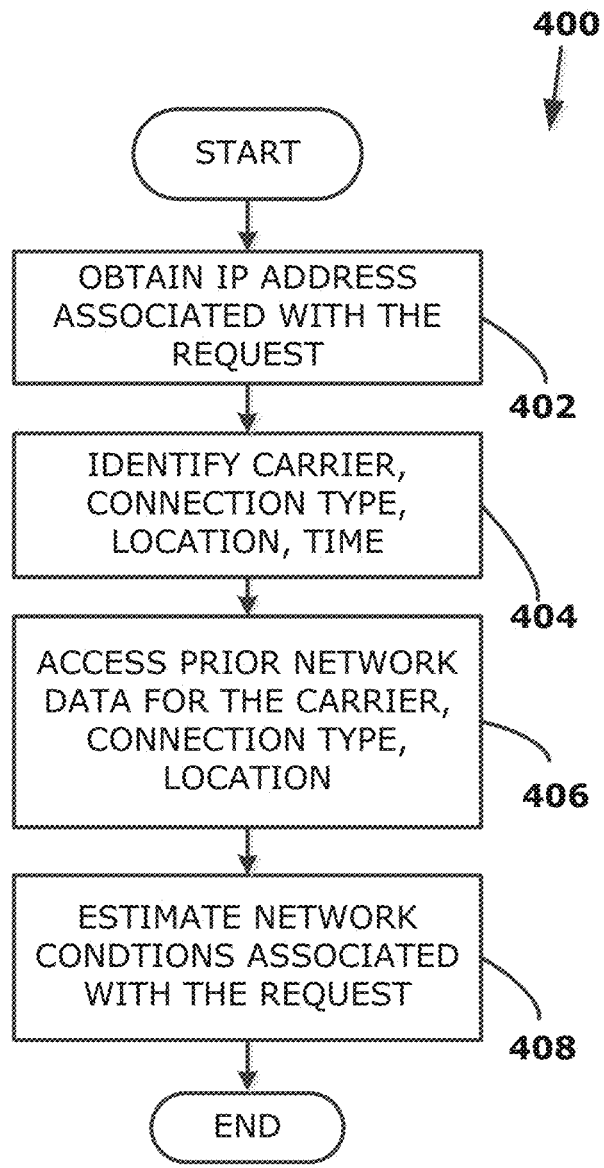
FIG. 4 is a flowchart that illustrates a method of estimating network conditions associated with the request for an image in accordance with some embodiments.

FIG. 4 is a flowchart 400 that illustrates a method of estimating network conditions associated with the request 152 for an image in accordance with some embodiments. The method begins at 402 wherein an IP (Internet Protocol) address of the client device 112 from which the request 152 originated is obtained at 402. The identity of the carrier, connection type (2G, 3G . . . ), geo-location of the client device 112 can be obtained at 404 based on the IP address. In addition, the time at which the request 112 originated can also be obtained at 404. At 406, prior network data 144 for the carrier and connection type combination at the given location and/or time. The current conditions of the network 170 can be estimated at 408 via statistical methodologies which are currently known or are to be invented.

Figure 5:
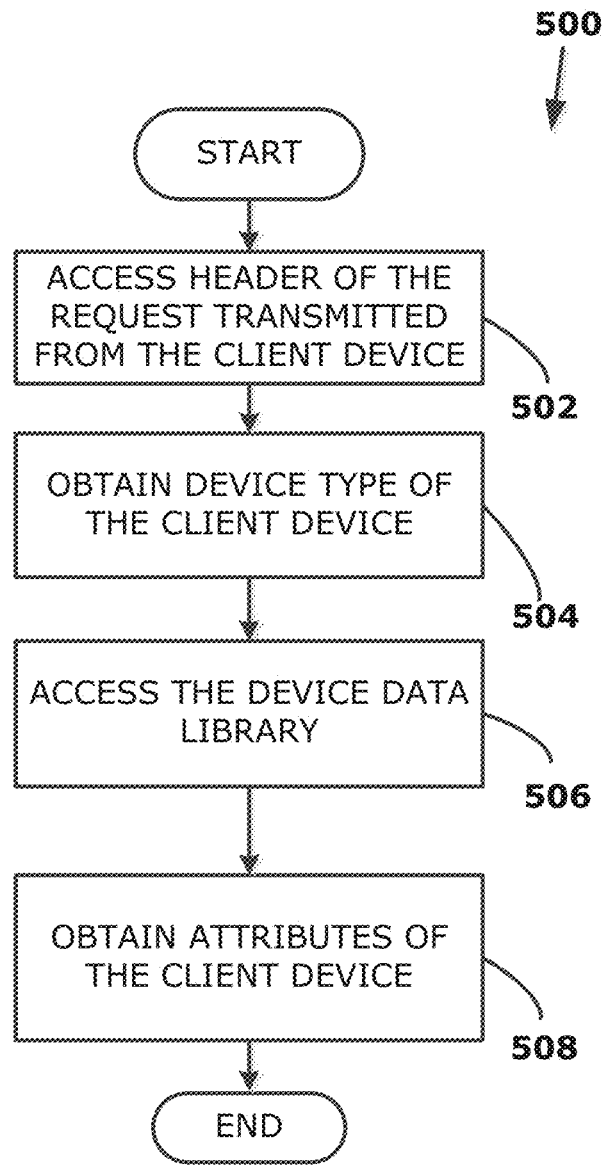
FIG. 5 is a flowchart that illustrates a method of obtaining attributes of the client device in accordance with embodiments detailed herein.

FIG. 5 is a flowchart 500 that illustrates a method of obtaining attributes of the client device 112 in accordance with embodiments detailed herein. The method begins at 502 wherein a header of the request 152 transmitted from the client device 112 is accessed. At 504, the device type, for example, the make and/or the model number of the client device 112 can be obtained. At 506, the device data library 142 is accessed in order to obtain the attributes of the client device 112. In some embodiments, the device data library 142 can comprise the hardware and/or the software specifications for various models of client devices. At 508, the attributes of the client device 112 are retrieved from the device data library 142. By the way of illustration and not limitation, the screen size of the client device 112 can be obtained at 508.

Figure 6:
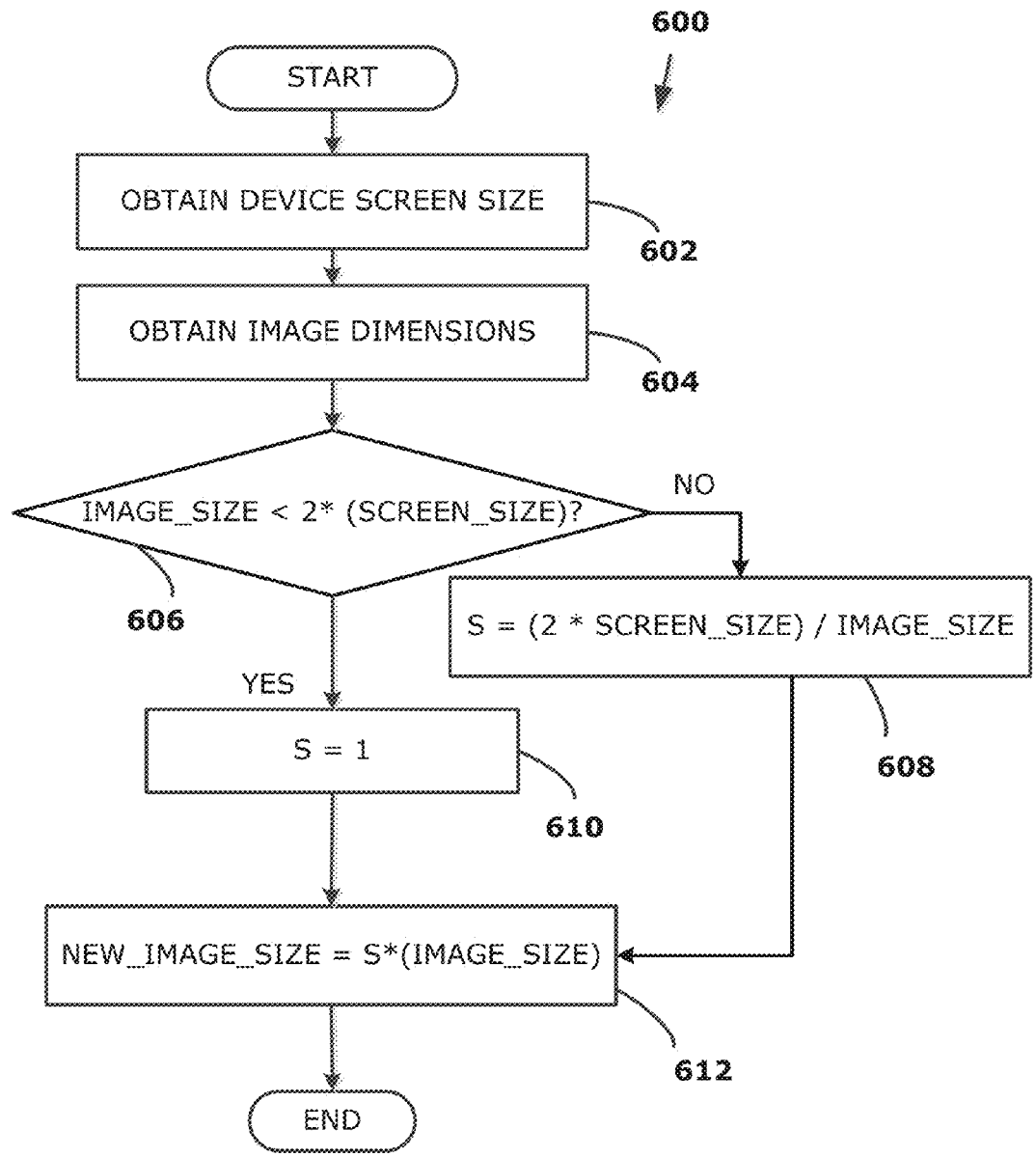
FIG. 6 is a flowchart that illustrates a method for selecting image parameters for optimal transmission in accordance with some embodiments.

FIG. 6 is a flowchart 600 that illustrates a method for selecting image parameters for optimal transmission in accordance with some embodiments. The method begins at 602 wherein attributes of the client device 112 including but not limited to its screen size are obtained. At 604, parameters of the original image requested by the client device 112 such as the image dimensions are obtained. At 606, the size or dimensions of the original image (IMAGE_SIZE) requested by the client device 112 is compared with the screen size (SCREEN_SIZE) of the client device 112. More particularly, it is determined if IMAGE_SIZE parameter is less than twice the SCREEN_SIZE. It may be appreciated that the image comparison ratio is discussed only for illustrative purposes and that any comparison ratio can be used in accordance with embodiments disclosed herein. If it is determined at 606 that IMAGE_SIZE is less than two times SCREEN_SIZE, then the scale factor for determining the new image size S will be set to '1' at 610. Accordingly, the NEW_IMAGE_SIZE as determined at 612 is the same as the original image size. If it is determined at 606 that IMAGE_SIZE is more than twice the SCREEN_SIZE, then the scale factor for determining the new image size S will be set to (2*SCREEN_SIZE)/IMAGE_SIZE at 610. Accordingly, the NEW_IMAGE_SIZE determined at 612 which is optimized for the network 170 and the client device 112 is smaller by a factor 'S' than the IMAGE_SIZE.

Figure 7:
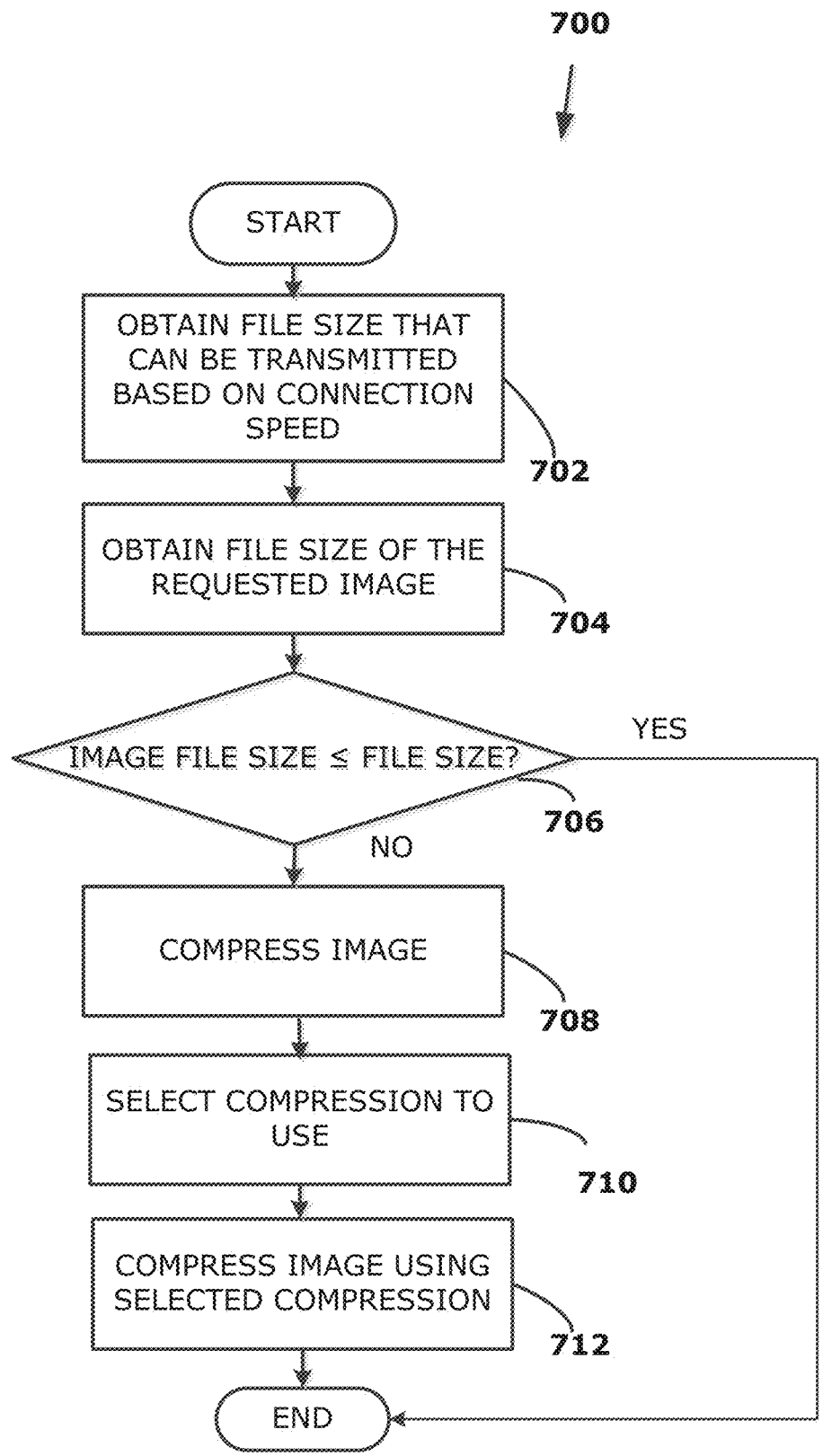
FIG. 7 illustrates a flowchart detailing a method for selecting image parameters for optimal transmission in accordance with some embodiments.

FIG. 7 illustrates a flowchart 700 detailing a method for selecting image parameters for optimal transmission in accordance with some embodiments. The method begins at 702 wherein the permissible image file size that can be transmitted is obtained. In some embodiments, the permissible file size can be obtained based, for example, on the weight of the connection speed 'c'. In some embodiments, when multiple images are to be transmitted, the permissible image file size for each image can be obtained, for example, by dividing the available bandwidth between the various images. At 704, the file size of the image to be transmitted to the client device 112 is obtained. If the image has been resized in accordance with embodiments disclosed, for example at FIG. 6, then the file size of the resized image can be obtained at 704. At 706, the image file size obtained at 704 is compared to the permissible file size determined at 702 to determine if the image file size at 704 is less than or equal to the permissible file size. If yes, it is determined that the image need not be compressed and the procedure terminates. If, on comparison at 706, it is determined that the image file size is greater than the permissible file size, then it is determined at 708 that the image should be compressed to the permissible file size limit. Accordingly, the best quantization lossy compression to use is determined at 710 and the image is compressed at 712 using the selected compression ratio.

If multiple images are associated with the request 152 from the client device 112, the methods discussed herein at for example, FIGS. 3, 6, 7 can be applied serially or in parallel, to each of the requested images so that each image fits its respective permissible file size limit. Moreover, it can be appreciated that for a requested image, parameters that are transformed can comprise one or more of the size and compression in accordance with embodiments described herein. As discussed supra, single image files or images that form part of webpages can be optimized in accordance with embodiments described herein. A webpage that comprises the transformed images can include a dynamic script so that the display of the image is adjusted to maintain the proportion of the images to other content on the webpage.

Figure 8:
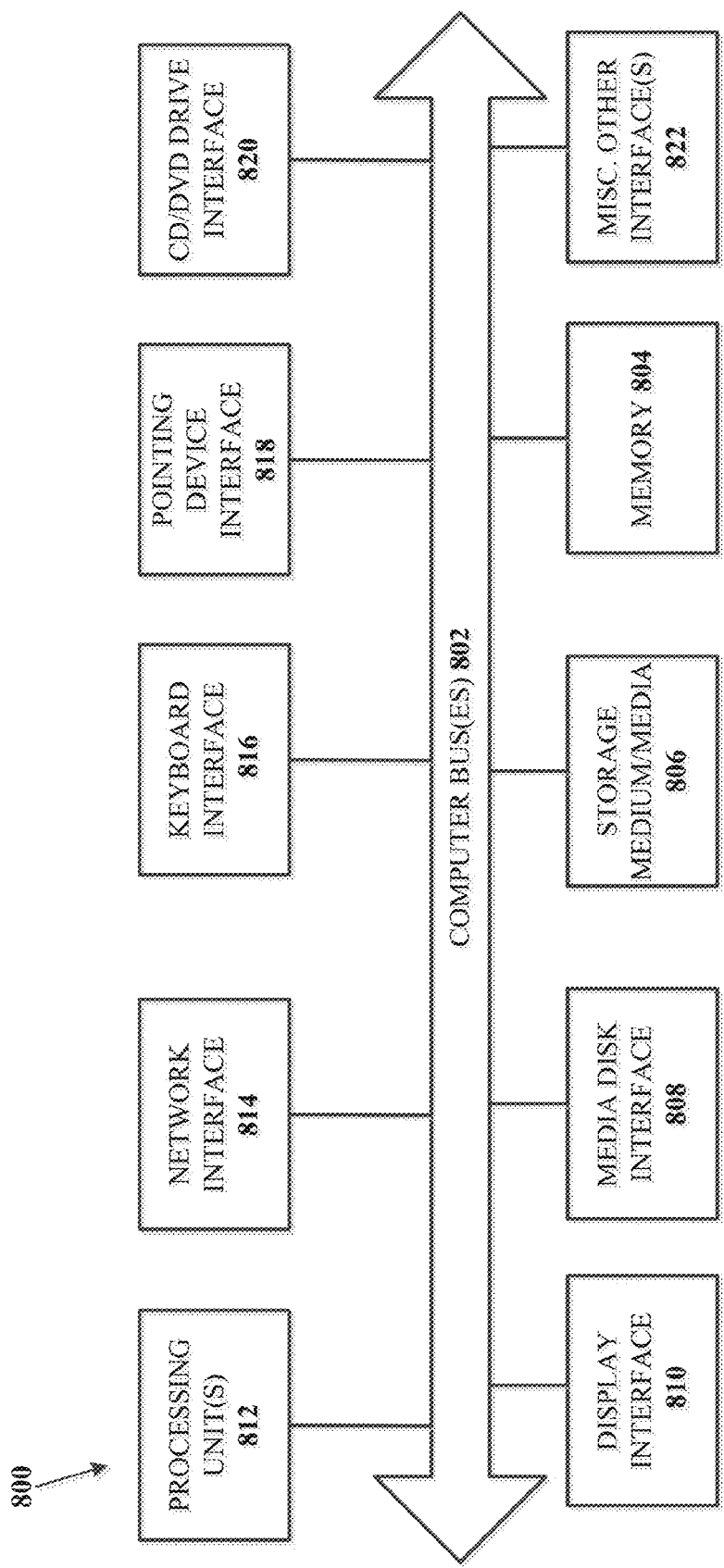
FIG. 8 illustrates internal architecture of a computing device in accordance with embodiments described herein.

As shown in the example of FIG. 8, internal architecture of a computing device 800 includes one or more processing units (also referred to herein as CPUs) 812, which interface with at least one computer bus 802. Also interfacing with computer bus 802 are persistent storage medium/media 806, network interface 814, memory 804, e.g., random access memory (RAM), run-time transient memory, read only memory (ROM), etc., media disk drive interface 808, an interface 820 for a drive that can read and/or write to media including removable media such as floppy, CD-ROM, DVD, etc., media, display interface 810 as interface for a monitor or other display device, keyboard interface 816 as interface for a keyboard, pointing device interface 818 as an interface for a mouse or other pointing device, and miscellaneous other interfaces 822 not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code or logic, and/or computer-executable process steps, incorporating functionality described herein, e.g., one or more of process flows described herein. CPU 812 first loads computer-executable process steps or logic from storage, e.g., memory 804, storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

Persistent storage medium/media 806 is a computer readable storage medium(s) that can be used to store software and data, e.g., an operating system and one or more application programs. Persistent storage medium/media 806 can also be used to store device drivers, such as one or more of a digital camera driver, monitor driver, printer driver, scanner driver, or other device drivers, web pages, content files, metadata, playlists and other files. Persistent storage medium/media 806 can further include program modules/program logic in accordance with embodiments described herein and data files used to implement one or more embodiments of the present disclosure.

Figure 9:
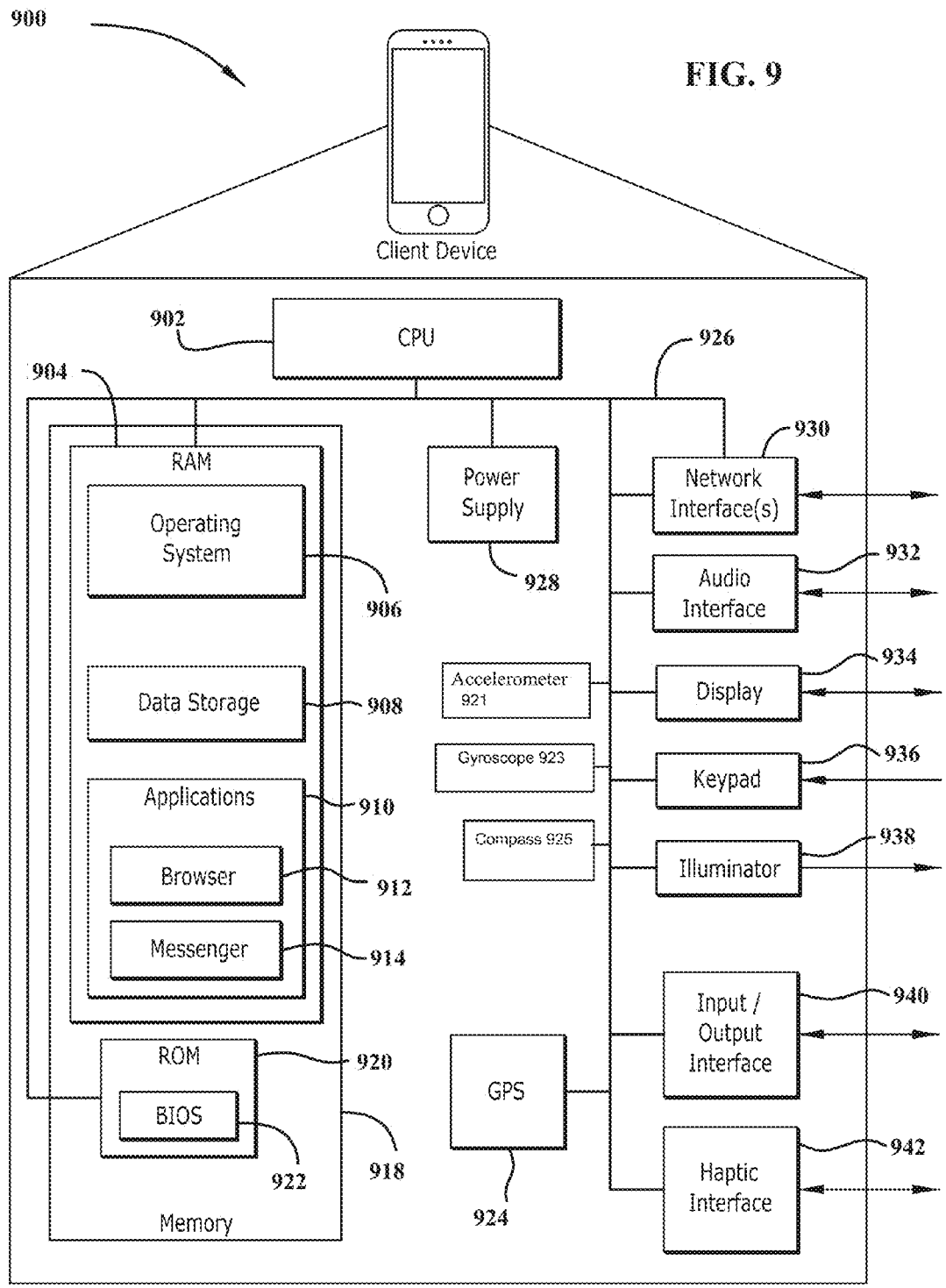
FIG. 9 is a schematic diagram illustrating a client device implementation of a computing device in accordance with embodiments of the present disclosure.

FIG. 9 is a schematic diagram illustrating a client device implementation of a computing device in accordance with embodiments of the present disclosure. A client device 900 may include a computing device capable of sending or receiving signals, such as via a wired or a wireless network, and capable of running application software or "apps" 910. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 902, power supply 928, a memory 918, ROM 920, BIOS 922, network interface(s) 930, audio interface 932, display 934, keypad 936, illuminator 938, I/O interface 940 interconnected via circuitry 926. Claimed subject matter is intended to cover a wide range of potential variations. For example, the keypad 936 of a cell phone may include a numeric keypad or a display 934 of limited functionality, such as a monochrome liquid crystal display (LCD) for displaying text. In contrast, however, as another example, a web-enabled client device 900 may include one or more physical or virtual keyboards 936, mass storage, one or more accelerometers 921, one or more gyroscopes 923 and a compass 925 global positioning system (GPS) 924 or other location identifying type capability, Haptic interface 942, or a display with a high degree of functionality, such as a touch-sensitive color 2D or 3D display, for example. The memory 918 can include Random Access Memory 904 including an area for data storage 908.

A client device 900 may include or may execute a variety of operating systems 906, including a personal computer operating system, such as a Windows, iOS or Linux, or a mobile operating system, such as iOS, Android, or Windows Mobile, or the like. A client device 900 may include or may execute a variety of possible applications 99, such as a client software application 914 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 900 may also include or execute an application to communicate content, such as, for example, textual content, multimedia content, or the like. A client device 900 may also include or execute an application to perform a variety of possible tasks, such as browsing 912, searching, playing various forms of content, including locally stored or streamed content, such as, video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), program logic, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method, comprising:
   analyzing, by a processor, a request for an image received from a client device via a network;
   obtaining, by the processor via the analysis, a plurality of attributes associated with the request, the plurality of attributes comprising at least network and client device attributes;
   accessing, by the processor, prior network conditions data associated with the plurality of attributes;
   estimating, by the processor, network conditions associated with the request based on the prior network conditions data;
   determining, by the processor, based on the estimated network conditions, if the image that is to be transmitted to the client device should be transformed before transmission by comparing one or more of image dimensions and an image file size with respective predetermined thresholds associated with the image;
   when the one or more of the image dimensions and the image file size exceed the respective predetermined thresholds:
   determining, by the processor, optimized parameters for the image based on the one or more of the image dimensions and the image file size, the plurality of attributes obtained from the request and the estimated network conditions; and
   transforming, by the processor, the image based on the optimized parameters; and
   transmitting, by the processor, the transformed image to the client device in response to the request.

2. The method of claim 1, further comprising:
   deducing, by the processor, a connection speed associated with the network based at least on the network attributes, the network attributes comprising a type of network connection, a network operator, location and time of the request.

3. The method of claim 1, wherein the optimized parameters are a size and quality of the image.

4. The method of claim 3, determining the size of the image further comprises:
   determining, by the processor, a screen size of the client device;
   comparing, by the processor, the screen size with the size of the image;
   determining, by the processor, value of a size factor 's' based on the comparison; and
   obtaining, by the processor, an optimized image size by reducing the image size by the factor 's'.

5. The method of claim 4, wherein the image size is smaller than twice the screen size and s is equal to one.

6. The method of claim 4, wherein the image is larger than twice the screen size and s equals (2*the screen size)/the image size.

7. The method of claim 3, further comprising:
determining, by the processor, a quantization lossy compression to use for altering the quality of the image based on the plurality of attributes.

8. The method of claim 5, wherein determining the compression to use further comprising:
accessing, by the processor, a pre-generated table comprising values for connection speed versus network conditions.

9. The method of claim 1, wherein the plurality of attributes comprise an IP address of the client device.

10. The method of claim 1, wherein the plurality of attributes comprise a screen size of the client device.

11. The method of claim 1 further comprising:
receiving, by the processor, the request for the image from the client device.

12. The method of claim 1, further comprising:
obtaining, by the processor, the attributes of the image requested by the client device.

13. An apparatus comprising:
at least one processor;
a storage medium for tangibly storing thereon program logic for execution by the processor, the program logic comprising:
analyzing logic, executed by the processor, for analyzing a request for an image received from a client device via a network;
obtaining logic, executed by the processor, for obtaining via the analysis, a plurality of attributes associated with the request, the plurality of attributes comprising at least network and client device attributes;
accessing logic, executed by the processor, for accessing prior network conditions data associated with the plurality of attributes;
estimating logic, executed by the processor, for estimating network conditions associated with the request based on the prior network conditions data;
determining logic, executed by the processor, for:
determining, based on the estimated network conditions, if the image that is to be transmitted to the client device should be transformed before transmission by comparing one or more of image dimensions and an image file size with respective predetermined thresholds associated with the image;
when the one or more of the image dimensions and the image file size exceed the respective predetermined thresholds:
determining optimized parameters for the image based on the one or more of the image dimensions and the image file size, the plurality of attributes obtained from the request and the estimated network conditions; and
transforming the image based on the optimized parameters; and
transmitting logic, executed by the processor, for transmitting the transformed image to the client device in response to the request.

14. The system of claim 13, further comprising:
deducing logic, executed by the processor, for deducing a connection speed associated with the network based at least on the network attributes, the network attributes comprising a type of network connection, a network operator, location and time of the request.

15. The system of claim 13, wherein the optimized parameters are a size and quality of the image.

16. The system of claim 15, wherein the determining logic further comprises:
screen size determining logic, executed by the processor, for determining a screen size of the client device;
comparing logic, executed by the processor, for comparing the screen size with the size of the image; and
size transforming logic, executed by the processor, for transforming the image size by a factor 's' based on the comparison.

17. The system of claim 15, further comprising:
compression determining logic, executed by the processor, for determining a quantization lossy compression to use for altering the quality of the image based on the plurality of attributes.

18. The system of claim 17, wherein compression determining logic further comprises:
table accessing logic, executed by the processor, for accessing a pre-generated table comprising values for connection speed versus network conditions.

19. A non-transitory computer readable storage medium, comprising instructions, which when executed by a processor cause the processor to:
analyze a request for an image received from a client device via a network;
obtain a plurality of attributes associated with the request, the plurality of attributes comprising at least network and client device attributes;
access prior network conditions data associated with the plurality of attributes;
estimate network conditions associated with the request based on the prior network conditions data;
determine, based on the estimated network conditions, if the image that is to be transmitted to the client device should be transformed before transmission by comparing one or more of image dimensions and an image file size with respective predetermined thresholds associated with the image;
when the one or more of the image dimensions and the image file size exceed the respective predetermined thresholds:
determine optimized parameters for the image based on the one or more of the image dimensions and the image file size, the plurality of attributes obtained from the request and the estimated network conditions; and
transform the image based on the optimized parameters; and
transmit the transformed image to the client device in response to the request.

20. The computer readable storage medium of claim 19, wherein the optimized parameters are a size and quality of the image.

* * * * *